US007418925B2

(12) United States Patent  (10) Patent No.: US 7,418,925 B2
Rutherford  (45) Date of Patent: Sep. 2, 2008

(54) MIRROR BIRD TOY

(75) Inventor: Ryan Rutherford, Rutherford, NJ (US)

(73) Assignee: JW Pet Company, Inc., Teterboro, NJ (US)

( * ) Notice: Subject to any disclaimer, the term of this patent is extended or adjusted under 35 U.S.C. 154(b) by 264 days.

(21) Appl. No.: 11/143,316

(22) Filed: Jun. 2, 2005

(65) Prior Publication Data

US 2006/0272591 A1    Dec. 7, 2006

(51) Int. Cl.
*A01K 29/00* (2006.01)
*G02B 5/10* (2006.01)
(52) U.S. Cl. ...................... 119/467; 359/850
(58) Field of Classification Search ........... 119/467, 119/477, 702, 707, 708; 359/546, 838, 850, 359/854, 855, 866, 871; D12/187, 188, 189; D06/300, 301, 302, 303, 304, 305, 306, 307, D06/308, 309
See application file for complete search history.

(56) References Cited

U.S. PATENT DOCUMENTS

| 569,503 | A | * | 10/1896 | Keyes | 359/851 |
|---|---|---|---|---|---|
| 574,254 | A | * | 12/1896 | Mosher et al. | 359/856 |
| D84,426 | S | * | 6/1931 | Marchand | D6/302 |
| D90,226 | S | * | 7/1933 | Allen | D26/56 |
| 2,119,208 | A | * | 5/1938 | Goldsmith | 359/860 |
| 2,352,923 | A | * | 7/1944 | Turner | 359/883 |
| 2,402,717 | A | * | 6/1946 | Winer | 428/83 |
| 2,717,577 | A | * | 9/1955 | Petsche | 119/537 |
| 2,796,042 | A | * | 6/1957 | Cope | 119/69.5 |
| 2,910,915 | A | * | 11/1959 | Harris | 359/605 |
| 3,664,301 | A | * | 5/1972 | Morrill | 119/258 |
| 3,678,901 | A | * | 7/1972 | Dulle | 119/537 |
| 3,771,854 | A | * | 11/1973 | Roark | 359/854 |
| D231,520 | S | * | 4/1974 | Harrison | D12/187 |
| 3,847,120 | A | * | 11/1974 | Hicks | 119/713 |
| 3,867,013 | A | * | 2/1975 | Ashenfarb | 359/855 |
| 3,876,293 | A | * | 4/1975 | Ramos | 359/630 |
| 3,911,866 | A | * | 10/1975 | Dodd | 119/537 |
| 3,936,669 | A | * | 2/1976 | Gardner | 362/141 |
| 4,013,351 | A | * | 3/1977 | Haile | 359/872 |
| 4,188,745 | A | * | 2/1980 | Harvey et al. | 446/227 |
| 4,268,121 | A | * | 5/1981 | Peskin | 359/856 |
| D261,970 | S | * | 11/1981 | Alexandris et al. | D6/302 |
| 4,345,819 | A | * | 8/1982 | Villa-Real | 359/865 |
| 4,560,257 | A | * | 12/1985 | Otema | 359/855 |
| 4,639,101 | A | * | 1/1987 | Stefancin, Jr. | 359/855 |
| D288,385 | S | * | 2/1987 | Hewitt | D6/302 |
| 4,643,544 | A | * | 2/1987 | Loughran | 359/854 |
| 4,702,534 | A | * | 10/1987 | Witt et al. | 312/114 |
| 4,753,436 | A | * | 6/1988 | Sinclair | 472/6 |
| 4,775,231 | A | * | 10/1988 | Granzow et al. | 359/860 |
| 4,898,560 | A | * | 2/1990 | Moscovich | 446/85 |
| D308,308 | S | * | 6/1990 | Keller | D6/444 |
| D320,873 | S | * | 10/1991 | Emmons | D30/125 |

(Continued)

*Primary Examiner*—Yvonne R. Abbott
(74) *Attorney, Agent, or Firm*—Katten Muchin Rosenman LLP (57) ABSTRACT

An improved mirrored bird toy is provided that includes an interior multiple reflecting capacity that can reflect multiple reflections of a pet bird in multiple directions. Exterior exposed edges of the various mirrors may be plastic coated for safety. The lower or bottom mirror may include a cut-out whereby the bird can gain better access to the toy. The toy is mountable, within a cage, to the cage bars using a screw and nut. An orienting gage is disposed on the reverse side below the screw nub.

22 Claims, 6 Drawing Sheets

U.S. PATENT DOCUMENTS

| | | | | |
|---|---|---|---|---|
| 5,175,645 A | * | 12/1992 | Bennett et al. | 359/530 |
| D334,166 S | * | 3/1993 | Rolph | D12/187 |
| 5,212,926 A | * | 5/1993 | Beasley | 52/745.1 |
| D357,588 S | * | 4/1995 | Fachinger | D6/304 |
| 5,517,365 A | * | 5/1996 | Takeyasu | 359/850 |
| D391,773 S | * | 3/1998 | Zaidman et al. | D6/312 |
| D401,423 S | * | 11/1998 | Zaidman | D6/302 |
| D428,841 S | * | 8/2000 | Hussaini et al. | D12/187 |
| 6,523,961 B2 | * | 2/2003 | Ilkov et al. | 353/99 |
| 6,941,332 B2 | * | 9/2005 | Jensen | 708/304 |
| D530,866 S | * | 10/2006 | Woltmann et al. | D30/119 |
| D535,925 S | * | 1/2007 | Baker | D12/187 |
| 2004/0156133 A1 | * | 8/2004 | Vernon | 359/866 |

* cited by examiner

MIRROR BIRD TOY

BACKGROUND OF THE INVENTION

1. Field of the Invention

The invention relates generally to pet entertainment equipment and, more particularly, to a mirrored toy capable of attracting and generating interaction with a pet animal.

2. Discussion of the Related Art

Most of the birds kept as pets and sold in the pet trade as companion birds belong to the Psittacine family of birds. The family includes the most popular bird, the parakeet, also called budgerigar or simply budgie, as well as lovebirds, cockatiels and parrots. These birds are highly inquisitive, agile, manipulative and easily trained. Being confined in cages, they are often perceived as suffering from boredom unless provided with some objects that arouse their interest.

Many so-called toys are being sold to keep these birds busy, but few of the toys seem to really challenge the bird's natural curiosity. Most toys are made for either chewing or climbing—certainly activities which these birds should engage in—but are not necessarily challenging to the bird's inquisitive mind. Other toys can merely be set swinging or turning if the bird simply pecks at them and will return to their original state or position once the bird loses interest.

Many birds initially find a conventional mirror engaging and may spend considerable amount of time observing their own image. Some birds seem to believe that their own reflection is actually another bird and may attempt to interact with their reflection. However, birds may become bored with a simple mirror and once the novelty wears off, may completely ignore the mirror.

Accordingly, a need exists for a mirrored toy that offers pet birds a more engaging interactive experience and presents the pet birds with a new experience over conventional mirrors.

A further need exists for a toy that continues to challenge pet birds' natural curiosity.

SUMMARY OF THE INVENTION

In accordance with the invention, an improved mirrored bird toy is provided. The inventive bird toy includes an interior multiple reflecting capacity, similar to that of a three-panel dressing room mirror. Exterior exposed edges of the various mirrors may be plastic coated for safety. The lower or bottom mirror may include a cut-out whereby the bird can gain better access to the toy. The toy is mountable, within a cage, to the cage bars using a screw and nut. An orienting gage is disposed on the reverse side below the screw nub.

More specifically, in a first aspect of the invention, a bird toy is provided that includes a plurality of mirrors disposed to create infinite reflections of a bird in multiple directions and an enclosure supporting the plurality of mirrors. In a second aspect of the invention, a bird toy is provided that includes five reflective surfaces disposed to each reflect multiple reflections from the other surfaces and an enclosure supporting the five reflective surfaces. The multiple reflections are oriented in multiple directions and at least one of the five reflective surfaces is adapted to allow a pet bird to approach the five reflective surfaces so that the pet bird is able to perceive multiple images of itself. In a third aspect of the present invention, a method of manufacturing a bird toy is provided that includes constructing an enclosure adapted to receive a plurality of mirrors and inserting mirrors within the enclosure such that the mirrors are disposed to reflect multiple reflections off of each other in multiple directions. According to this aspect, inserting the mirrors includes adapting at least one mirror to enable a pet bird to approach the mirrors so that the pet bird is able to perceive multiple images of itself.

The above and other features of the invention will become more readily apparent from the following detailed description accompanied by the following drawings.

DETAILED DESCRIPTION OF THE INVENTION

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices. Furthermore, such terms as "toy," "mirrored toy," "bird toy," and "mirrored bird toy" are used interchangeably. The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Figure 1:
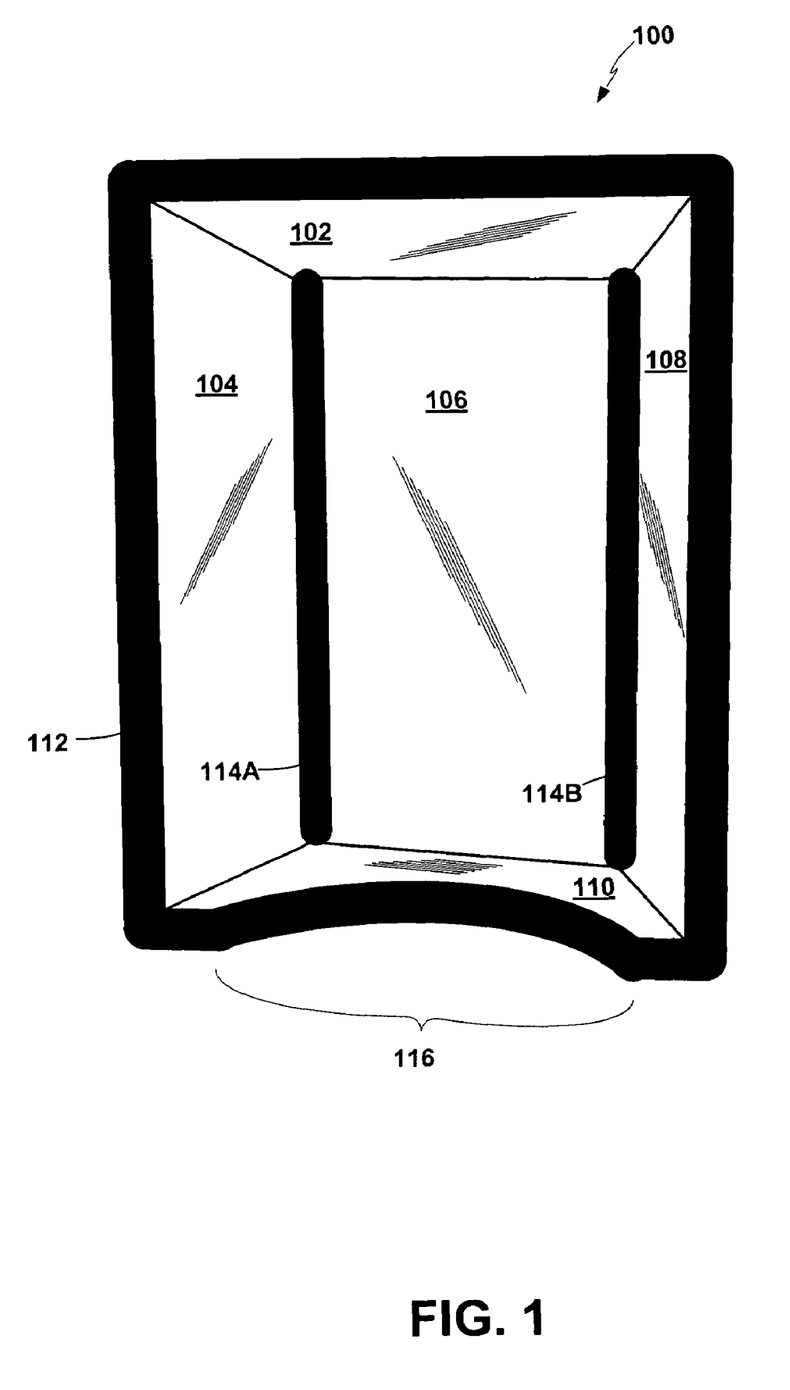
FIG. 1 is a perspective view of a preferred embodiment of the inventive toy according to the present invention.
Figure 2:
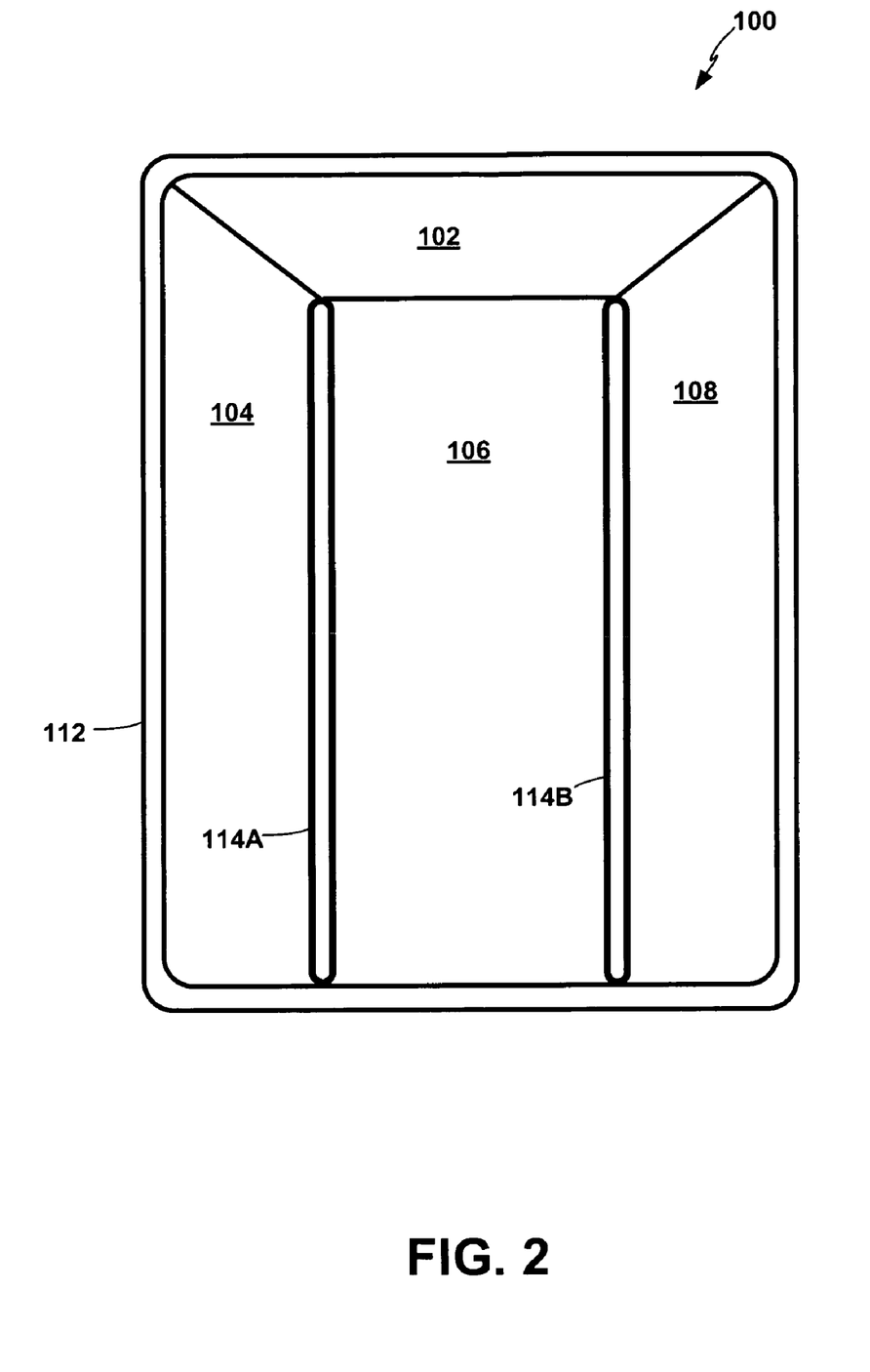
FIG. 2 is a front elevational view of the inventive toy of FIG. 1.
Figure 3:
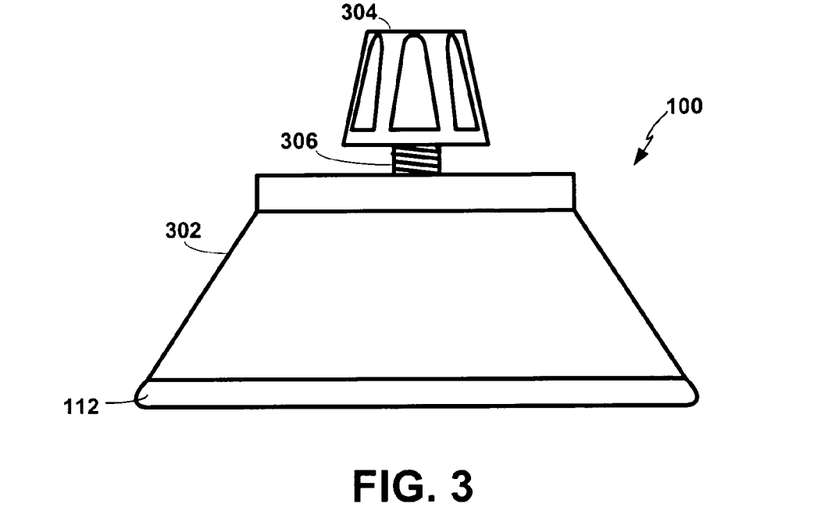
FIG. 3 is a top elevational view of the inventive toy shown in FIG. 1.

Turning to FIG. 1, a perspective view of the front of bird toy 100 is depicted. Bird toy 100 may include two or more mirrors 102, 104, 106, 108, 110 within a concave housing and disposed relative to each other so as to create multiple reflections (e.g., infinite reflections of reflections) in multiple directions (e.g., up, down, front, side to side). The effect of the toy 100 may make a pet bird think it is seeing many other birds rather than merely the bird's own reflections. Although only five mirrors 102, 104, 106, 108, 110 are shown in the example of FIG. 1 (e.g., a top, a front, a bottom, and two side mirrors), many additional mirrors may be used. For example, mirror 106 may be replaced by three mirrors angled to create additional reflections. Bird toy 100 may also include edging 112 and retaining bars 114A, 114B surrounding mirrors 102, 104, 106, 108, 110.

In some embodiments, mirrors 102, 104, 106, 108, 110 may be manufactured from any material with reflective characteristics including for example, highly polished metal, acrylic and/or glass. In addition, materials used to manufacture the mirrors 102, 104, 106, 108, 110 may be bird-safe (e.g., shatter resistant and/or impervious to all forces a bird can generate) and/or shatter proof. This feature of the present invention may prevent damage to the mirror or harm to the bird resulting from scratching, clawing, chewing, and/or pecking at the reflections by the pet bird. In some embodiments, the positioning of some or all of the mirrors 102, 104, 106, 108, 110 may be fixed or adjustable. Adjustable mirrors may each pivot or slide on a bracket behind the mirrors and may allow a caretaker to vary the bird's experience with the toy 100 to continually challenge pet bird's natural curiosity. In some embodiments, the pet bird may be able to change the mirror positions, alignment, or orientations.

In some embodiments, as shown in FIG. 1, the bottom mirror 110 may include a concave cutout 116 to allow the bird better access (e.g., allowing the bird to move deeper into the toy 100) and proximity to the mirrors 102, 104, 106, 108, 110 of bird toy 100. Positioning itself in cutout 116 may provide the bird with greater interaction with mirrors 102, 104, 106, 108, 110 and the associated reflections. In some embodiments, the cutout may be in a mirror other than the bottom mirror 110.

The edging 112 may serve to protect the pet bird from sharp edges of the mirrors 102, 104, 106, 108, 110 as well as to help retain the mirrors within the toy 100. The edging 112 may be rounded and made from plastic or any suitable, practicable material. Further the edging 112 may be of any color or combination of colors. In some embodiments, the edging may not be used in which case the mirrors 102, 104, 106, 108, 110 may have beveled or rounded edges.

Embodiments of the bird toy 100 may include mirror retaining bars 114A, 114B to hold mirrors 102, 104, 106, 108, 110 in place within the toy 100. The retaining bars 114A, 114B may snap in and out of the toy 100 so as to allow removal of the mirrors 102, 104, 106, 108, 110 for cleaning or repair/replacement. In some embodiments, the mirrors 102, 104, 106, 108, 110 may be replaceable with distorted "fun house" type mirrors to further challenge pet bird's natural curiosity.

In some embodiments, bird toy 100 may include sound-generating (e.g., bird song, chirping, pet owner's recorded voice, pet's recorded voice, etc.) and/or light-generating electronic devices (not shown) activated either manually (e.g., via a caretaker controlled on/off switch) or automatically in response to a pet bird pecking at its reflection and/or by tripping a sensor as the bird approaches the toy 100.

Referring now to FIGS. 2 through 6, front, top, bottom, side, and back elevational views of bird toy 100 are respectively depicted. From the top, bottom, side, and rear views, the exterior surface of the enclosure 302 of the toy 100 is visible. Enclosure 302 may be formed from plastic or any suitable material sufficiently rigid to support the mirrors 102, 104, 106, 108, 110 and to withstand pecking, clawing, and chewing of the toy 100. In some embodiments, the mirrored bird toy 100 may be approximately 3.25" wide×4.25" wide× 1.25" deep to accommodate birds such as parakeets, lovebirds, cockatiels, parrots, and the like. However, bird toys 100 of other sizes, orientations, and/or proportions may be employed for larger and/or smaller birds. In some embodiments, the enclosure 302 may include deeper sides and/or a front such that a pet bird entering the toy 100 (e.g., via a bottom cut-out) may be completely surrounded on all sides by reflecting surfaces.

Protruding from the back surface of enclosure 302, a nub screw 306 may be adapted to receive a retaining nut 304. The retaining nut 304 and nub screw 306 may be used to mount the bird toy 100 to the bars of a bird cage. The enclosure 302 may also include edging 112, described above with respect to FIG. 1. The enclosure 302, including the edging 112, the retaining bars 114A, 114B, and/or the nub screw 306 may be formed from a single piece of molded material. Alternatively, any or all of the edging 112, the retaining bars 114A, 114B, and/or the nub screw 306 may be attached to the enclosure 302 during manufacturing of the toy 100. In some embodiments, the component parts may be sold as a kit that the pet caretaker assembles.

Figure 4:
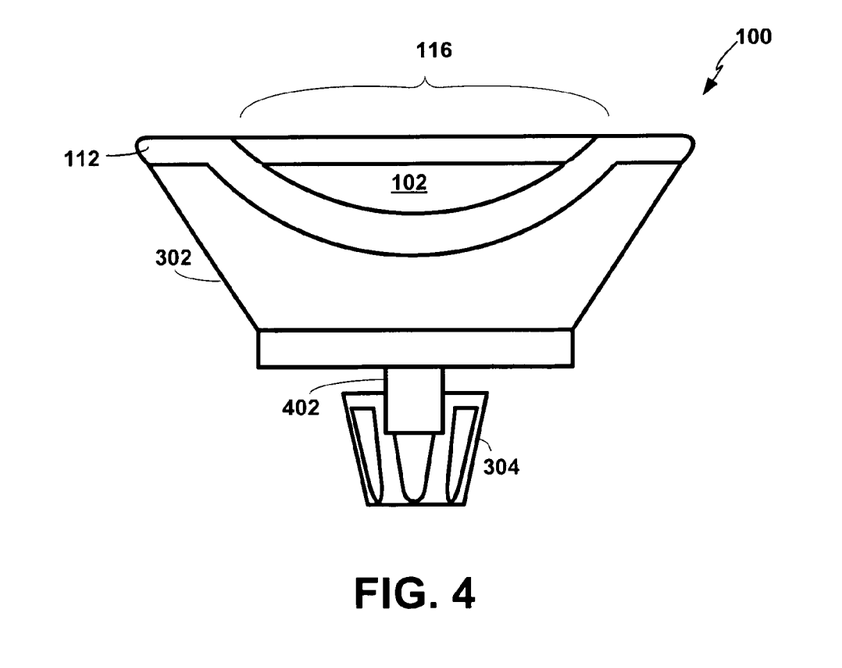
FIG. 4 is a bottom elevational view of the inventive toy of FIG. 1.
Figure 5:
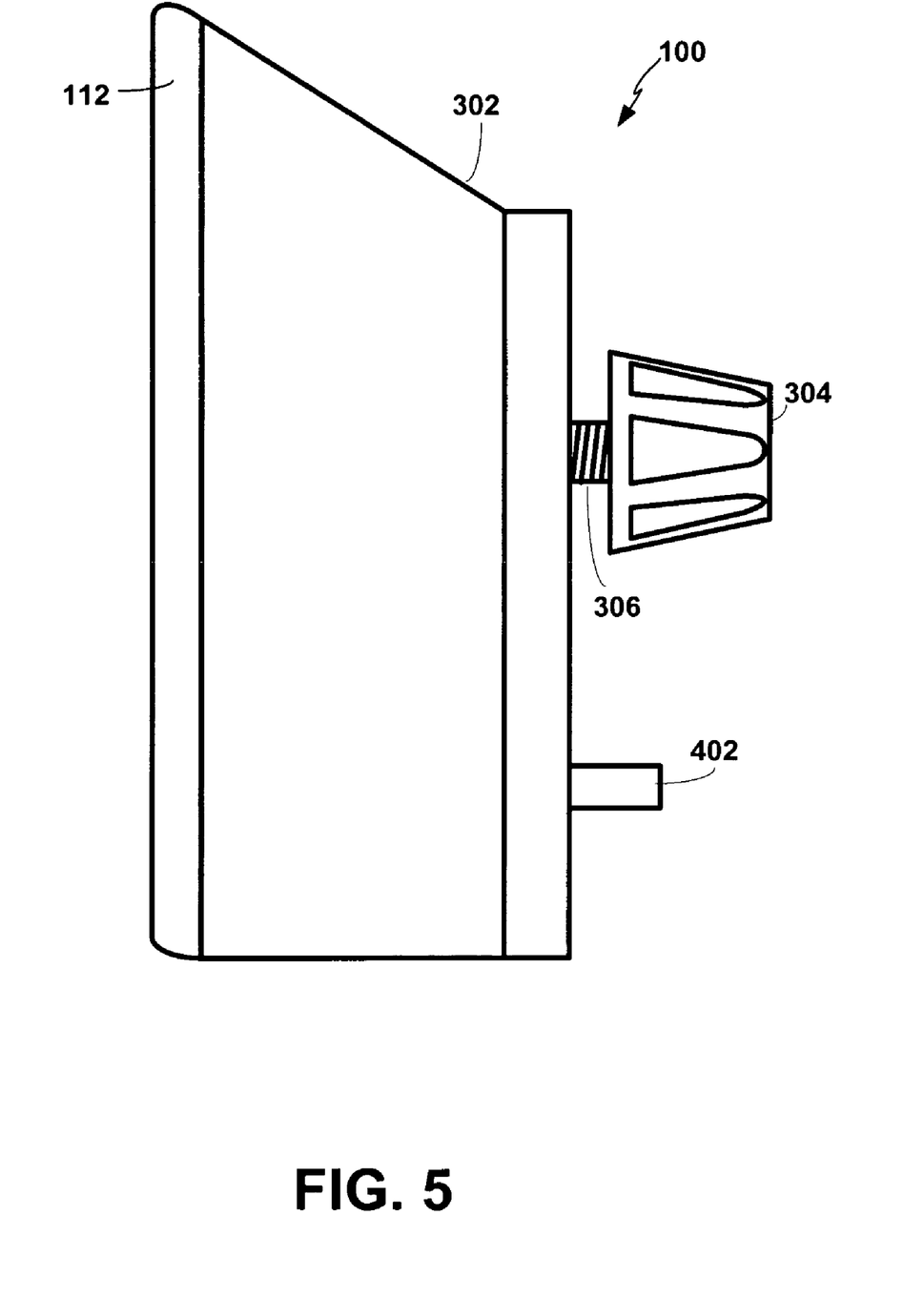
FIG. 5 is a side elevational view of the inventive toy of FIG. 1.
Figure 6:
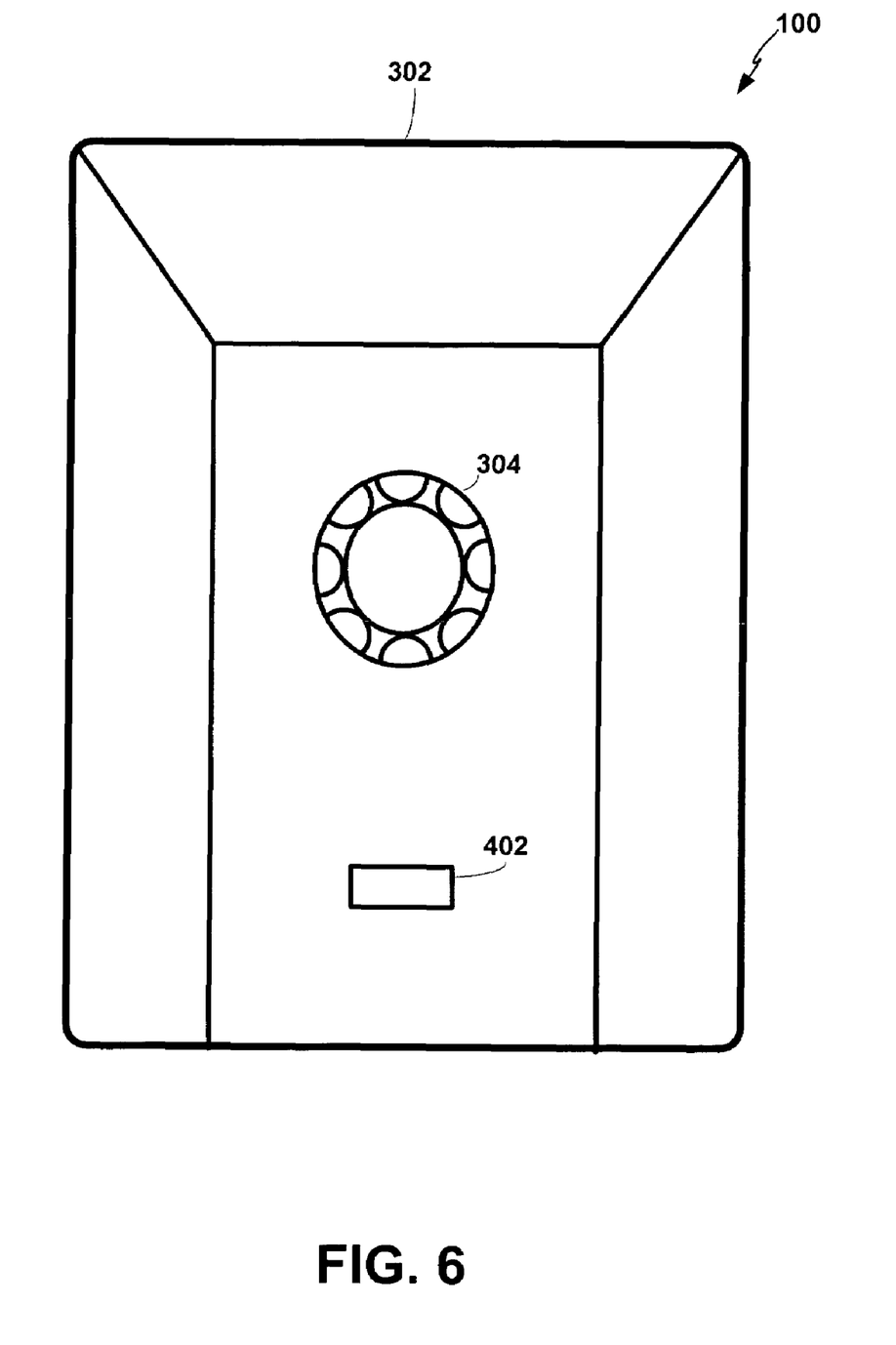
FIG. 6 is a rear elevational view of the inventive toy of FIG. 1.

From the views depicted in FIGS. 4 though 6, (i.e., the bottom, side and rear elevational views, respectively) a gage 402 may be seen protruding from the back of the enclosure 302. In conjunction with the retaining nut 304 and nub screw 306, the gage 402 may be used to secure the mirrored bird toy to the bars of a bird cage in either a vertical or horizontal orientation. In some embodiments, other orientations may be used. The gage 402 and nub screw 306 are fit between the bars of the cage and the retaining nut 304 is then fastened to the nub screw 306. The gage 402 prevents the toy 100 from rotating and loosening the retaining nut 306 as the pet bird interacts with the mirror.

Figure 7:
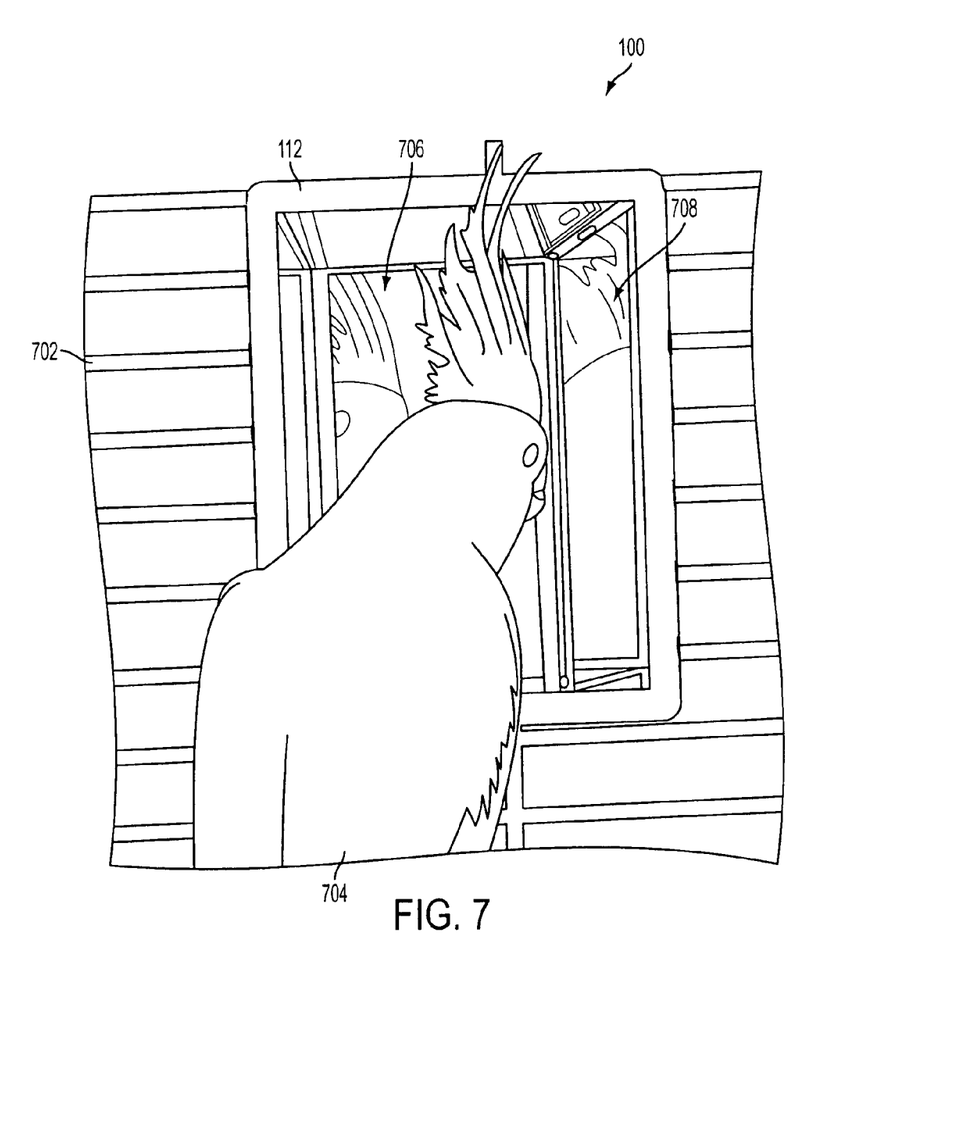
FIG. 7 is a perspective view of the inventive toy of FIG. 1 shown mounted on the bars of a cage behind a pet bird interacting with the toy.

Turning now to FIG. 7, the mirrored bird toy 100 is depicted in a perspective view mounted to the horizontal bars 702 of a bird cage. Note that the toy 100 may alternatively be mounted to vertical bird cage bars. A bird 704 is shown interacting with its multiple reflected images 706, 708 in FIG. 7.

This document describes the inventive toy 100 for illustration purposes only. Neither the specific embodiments of the invention as a whole, nor those of its features limit the general principles underlying the invention. In particular, the invention is not limited to any specific configuration of mirrors 102, 104, 106, 108, 110, shapes or sizes of enclosure 302, edging 112, and retaining bars 114A, 114B. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention.

Further, while the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A bird toy comprising:
a plurality of mirrors disposed to create infinite reflections of reflections of a bird in multiple directions; and
an enclosure housing the plurality of mirrors;

wherein one of the plurality of mirrors comprises a cut-out on an edge of the one of the plurality of mirrors and the enclosure.

2. The bird toy of claim 1 wherein edges of the mirrors are covered by edging.

3. The toy of claim 1 wherein the enclosure is adapted to be mounted on bars of a birdcage.

4. The bird toy of claim 3 wherein the enclosure includes an orientation gage protruding from the surface of the enclosure.

5. The bird toy of claim 1 wherein the plurality of mirrors are each made from shatter-proof materials.

6. The bird toy of claim 1, wherein the cut-out is arcuate.

7. A bird toy comprising:
   a plurality of mirrors disposed to create infinite reflections of a bird in multiple directions; and
   an enclosure supporting the plurality of mirrors;
   wherein one of the plurality of mirrors comprises a cut-out on an edge of the one of the plurality of mirrors and the enclosure;
   wherein the plurality of mirrors include at least top, bottom, front and two side mirrors.

8. A bird toy comprising:
   five reflective surfaces disposed to each reflect multiple reflections from at least one of others of the five reflective surfaces, wherein the multiple reflections are oriented in multiple directions, and wherein at least one of the five reflective surfaces is adapted to allow a pet bird to approach the five reflective surfaces so that the pet bird is able to perceive multiple images of the pet bird; and
   an enclosure supporting the five reflective surfaces;
   wherein one of the reflective surfaces comprises an arcuate cut-out in the reflective surface.

9. The bird toy of claim 8 wherein edges of the five reflective surfaces are covered by edging.

10. The bird toy of claim 8 wherein the enclosure is adapted to be mounted on bars of a birdcage.

11. The bird toy of claim 10 wherein the enclosure includes an orientation gage protruding from the surface of the enclosure.

12. The bird toy of claim 8 wherein the five reflective surfaces include at least a top mirror, a bottom mirror, a front mirror, a left side mirror, and a right side mirror.

13. The bird toy of claim 8 wherein the five reflective surfaces are each made from bird-safe materials.

14. The bird toy of claim 8, wherein the cut-out is also disposed in the enclosure.

15. A method of manufacturing a bird toy, comprising:
    constructing an enclosure adapted to receive a plurality of mirrors; and
    inserting mirrors within the enclosures such that the mirrors are disposed to reflect multiple reflections off of each other in multiple directions,
    wherein inserting the mirrors includes adapting at least one mirror to enable a pet bird to approach the mirrors so that the pet bird is able to perceive multiple images of the pet bird;
    wherein one of the plurality of mirrors comprises a cut-out on an edge of the one of the plurality of mirrors and the enclosure.

16. The method of claim 15 further comprising covering edges of the mirrors with a protective edging.

17. The method of claim 15 further comprising adapting the enclosures to be mounted on bars of a birdcage.

18. The method of claim 17 further comprising adapting the enclosure to be mountable on either horizontal or vertical birdcage bars.

19. The method of claim 15 wherein inserting mirrors includes inserting mirrors made from bird-safe materials.

20. A method of manufacturing a bird toy, comprising:
    constructing an enclosure adapted to receive a plurality of mirrors; and
    inserting mirrors within the enclosures such that the mirrors are disposed to reflect multiple reflections off of each other in multiple directions,
    wherein inserting the mirrors includes adapting at least one mirror to enable a pet bird to approach the mirrors so that the pet bird is able to perceive multiple images of the pet bird;
    wherein one of the plurality of mirrors comprises a cut-out on an edge of the one of the plurality of mirrors and the enclosure;
    wherein constructing an enclosure includes constructing an enclosure adapted to receive five mirrors including a top mirror, a bottom mirror, a front mirror, a left side mirror, and a right side mirror.

21. A method of manufacturing a bird toy, comprising:
    constructing an enclosure adapted to receive a plurality of mirrors; and
    inserting mirrors within the enclosures such that the mirrors are disposed to reflect multiple reflections off of each other in multiple directions,
    wherein inserting the mirrors includes adapting at least one mirror to enable a pet bird to approach the mirrors so that the pet bird is able to perceive multiple images of the pet bird;
    wherein adapting at least one mirror includes forming a concave cut-out on an edge of the at least one mirror.

22. The method of claim 21 wherein inserting mirrors within the enclosure further comprises inserting the at least one mirror with the concave cut-out into a bottom portion of the enclosure.

* * * * *